US007319979B2

(12) United States Patent
Thomas et al.

(10) Patent No.: US 7,319,979 B2
(45) Date of Patent: Jan. 15, 2008

(54) DYNAMICALLY INTERACTING WITH AN INTERNET SERVICE USING A CLIENT-SPECIFIED COMMUNICATION PROXY AND PROTOCOL

(75) Inventors: Christian R. Thomas, Scottsdale, AZ (US); Narasimha R. Edala, Chandler, AZ (US); Joel I. Marcey, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 979 days.

(21) Appl. No.: 09/823,084

(22) Filed: Mar. 29, 2001

(65) Prior Publication Data

US 2002/0143641 A1 Oct. 3, 2002

(51) Int. Cl.
*G06Q 30/00* (2006.01)
*G06F 15/16* (2006.01)
*G06F 15/167* (2006.01)
*G06F 15/173* (2006.01)
*G06F 15/177* (2006.01)

(52) U.S. Cl. .................. 705/26; 709/216; 709/223; 709/226; 709/230; 709/235; 709/203; 719/315; 719/316; 707/1; 707/204

(58) Field of Classification Search ............... 705/26, 705/27; 709/216, 223, 230, 203, 226, 235; 719/315, 316; 707/1, 204
See application file for complete search history.

(56) References Cited

U.S. PATENT DOCUMENTS

| 6,026,414 | A | * | 2/2000 | Anglin | 707/204 |
| 6,167,438 | A | * | 12/2000 | Yates et al. | 709/216 |
| 6,542,908 | B1 | * | 4/2003 | Ims | 707/204 |
| 6,594,700 | B1 | * | 7/2003 | Graham et al. | 709/230 |
| 6,708,223 | B1 | * | 3/2004 | Wang et al. | 719/315 |
| 6,735,771 | B1 | * | 5/2004 | Houlding | 719/315 |
| 6,922,685 | B2 | * | 7/2005 | Greene et al. | 707/1 |
| 6,950,875 | B1 | * | 9/2005 | Slaughter et al. | 709/230 |
| 2002/0087714 | A1 | * | 7/2002 | Connor | 709/235 |
| 2002/0133581 | A1 | * | 9/2002 | Schwartz et al. | 709/223 |
| 2005/0021759 | A1 | * | 1/2005 | Gupta et al. | 709/226 |

FOREIGN PATENT DOCUMENTS

WO    WO 00/77634    * 12/2000

OTHER PUBLICATIONS

Gopalan, Suresh Rai, "Jini Technology"; published on the Web Cornucopia © site and last updated on Dec. 19, 1998, extracted from the Internet Google site on Apr. 19, 2004.*
Waldo, Jim, "The Jini Architecture for network-centric computing"; Communications of the ACM v42n7 pp. 76-82 Jul. 1999 ISSN: 0001-0782; extracted from Dialog on Jul. 5, 2007; Dialog File 15:ABI/Inform( R); 01850272 05-01264.*

* cited by examiner

*Primary Examiner*—Yogesh C. Garg
(74) *Attorney, Agent, or Firm*—Blakely, Sokoloff, Taylor & Zafman LLP

(57) ABSTRACT

A method is provided for clients to locate and interact with Internet services fulfilling the clients needs. In an aspect, a client requests, to a broker, a specific language/component technology (communication proxy), and an application-level transport protocol. The broker matches a client request and an Internet service, and transmits metadata to the client enabling the client to locate the matched internet service communication proxy. In an aspect, the client downloads the requested communication proxy and dynamically interacts, at runtime, with an Internet service using the requested communication proxy, the communication proxy being local to the client. In an aspect, the client is relieved from having to develop a remote communications code.

17 Claims, 5 Drawing Sheets

DYNAMICALLY INTERACTING WITH AN INTERNET SERVICE USING A CLIENT-SPECIFIED COMMUNICATION PROXY AND PROTOCOL

FIELD

This invention relates to matching and interaction of clients and Internet services, more particularly, dynamically interacting, at runtime, with an Internet service using a client specified communication proxy type and protocol, the client and the Internet service matched by a broker.

BACKGROUND

Several technologies are available for discovering devices and web services, including Salutation, E-Speak, Jini, and Universal Description Discovery and Integration (UDDI). These technologies are often employed by Internet services, clients that request Internet services, and brokers to help coordinate interaction between an Internet service and a client. Salutation and E-Speak rely on a proprietary transport that funnels through a broker, requiring clients and services to be built with respective products such that both use an agreed protocol. Jini provides a Java object to clients to interact with a service, requiring the Java object to interact with another Java object alone, whether it is a Java client or a Java wrapper. The protocol used between the Java object and the service is determined by the service. UDDI provides a client with Web Service Description Language (WSDL) and the client develops a communications code based on methods and parameters disclosed by the WSDL.

Currently employed technologies utilize a service, a broker and a communications proxy for clients to interact with an Internet service, but they fail to provide a method, a required Application Program Interface (API) and implementations for clients to specify a desired application-level transport protocol and a language/component technology. With current technologies, a client has no ability to specify a protocol that makes the most sense for the client. As an example of a conventional method, Jini, a server centric model, provides a Java object to clients to interact with a service. There is no negotiation between the service and the client for type of proxy. The protocol used between the Java object and the service is determined by the service.

BRIEF DESCRIPTION OF THE DRAWINGS

Additional advantages of the invention will become apparent upon reading the following detailed description and upon reference to the drawings, in which.

DETAILED DESCRIPTION

Exemplary embodiments are described with reference to specific configurations. Those of ordinary skill in the art will appreciate that various changes and modifications can be made while remaining within the scope of the appended claims. Additionally, well-known elements, devices, components, circuits, process steps and the like are not set forth in detail in order to avoid obscuring the present invention.

As existing businesses and new businesses expand to the Internet, brokers and repositories play an increasing role as focal points in the Internet infrastructure. In an embodiment of the invention, a method is provided for clients to locate Internet services fulfilling the clients needs. In contrast to currently employed technologies, an embodiment of the invention provides a client centric model. Clients and Internet services are matched by a broker. In an embodiment of the invention, clients specify a type of communications proxy that can be different than a proxy used by an Internet service, promoting interaction between heterogeneous systems. In an embodiment, the invention provides a method and apparatus for clients to dynamically interact, at runtime, with an Internet service using at least one of a client specified language/component technology and a client specified application-level communications protocol. In an embodiment, a client requests, to a broker, a specific language/component technology (communication proxy), and, optionally, an application-level transport protocol. The broker matches the client request and an Internet service, and transmits metadata to the client enabling the client to locate the matched Internet service communication proxy. The language/component technologies include Java, common language runtime (CLR), component object model (COM), Win32 binaries, etc. The application-level communications protocols include hypertext transfer protocol (HTTP), simple mail transfer protocol (SMTP), simple object access protocol (SOAP), secure sockets layer (SSL/HTTPS), secure HTTP (S-HTTP), etc. In an embodiment, the client downloads the requested communication proxy and dynamically interacts, at runtime, with an Internet service using the requested communication proxy, the communication proxy being local to the client. In an embodiment of the invention, a client application is executing, and during runtime the client is interacting with the communications proxy. By "dynamically interact" it is meant, in an embodiment of the invention, that the client has no prior knowledge of what is needed to interact with an Internet service. In an embodiment of the invention, the client is relieved from having to develop a remote communications code.

Figure 1:
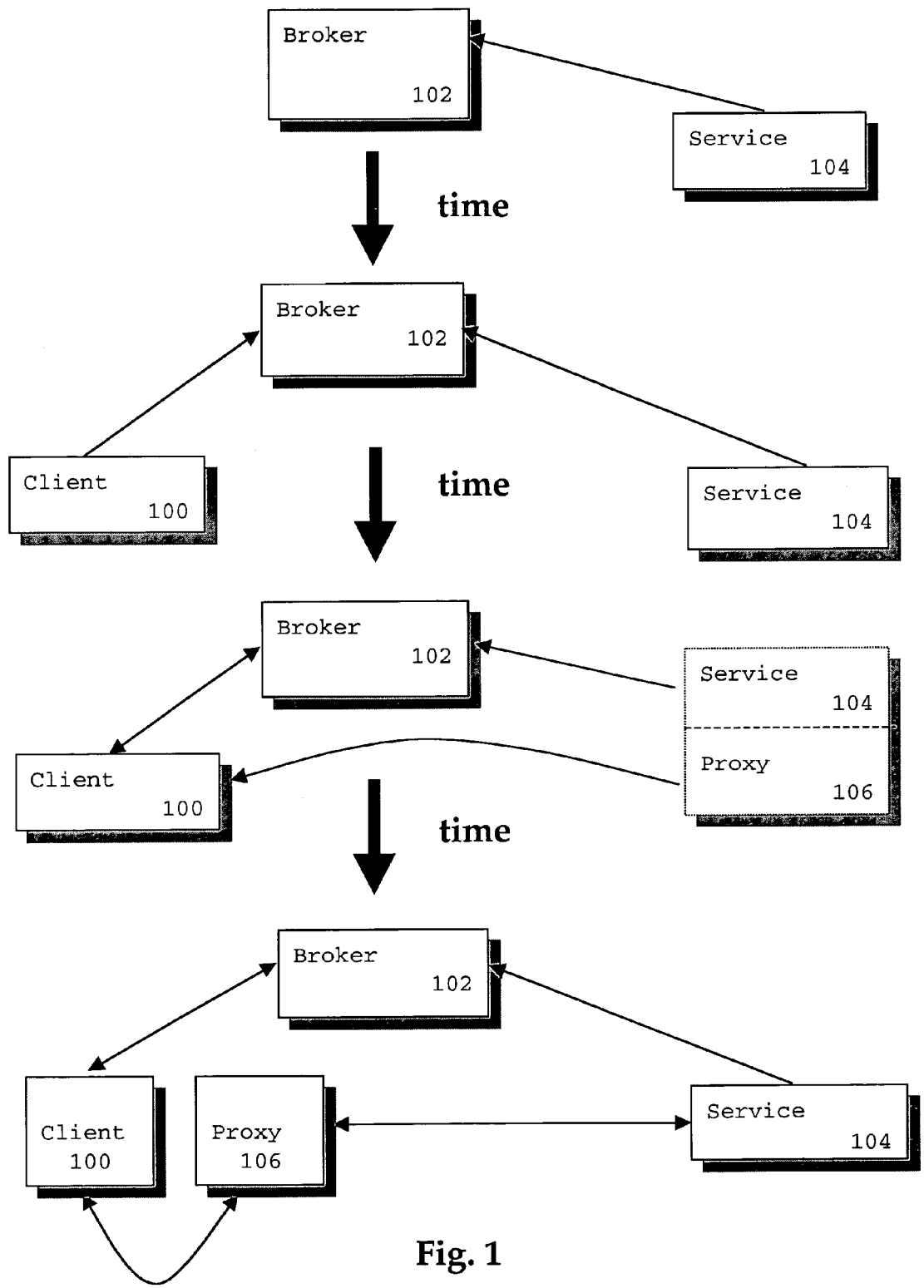
FIG. 1 depicts a representation of the interaction of four invention components over time in an embodiment of the invention.

As shown in FIG. 1, four components, namely, Client 100, Broker 102, Service 104, and Proxy 106 are involved in interaction in an embodiment of the invention. While the components interaction is presented with respect to advancing time, the interaction is variable, and not restricted to the interaction depicted. FIG. 1 presents an enhanced visual representation of the functional blocks of FIG. 2.

Figure 2:
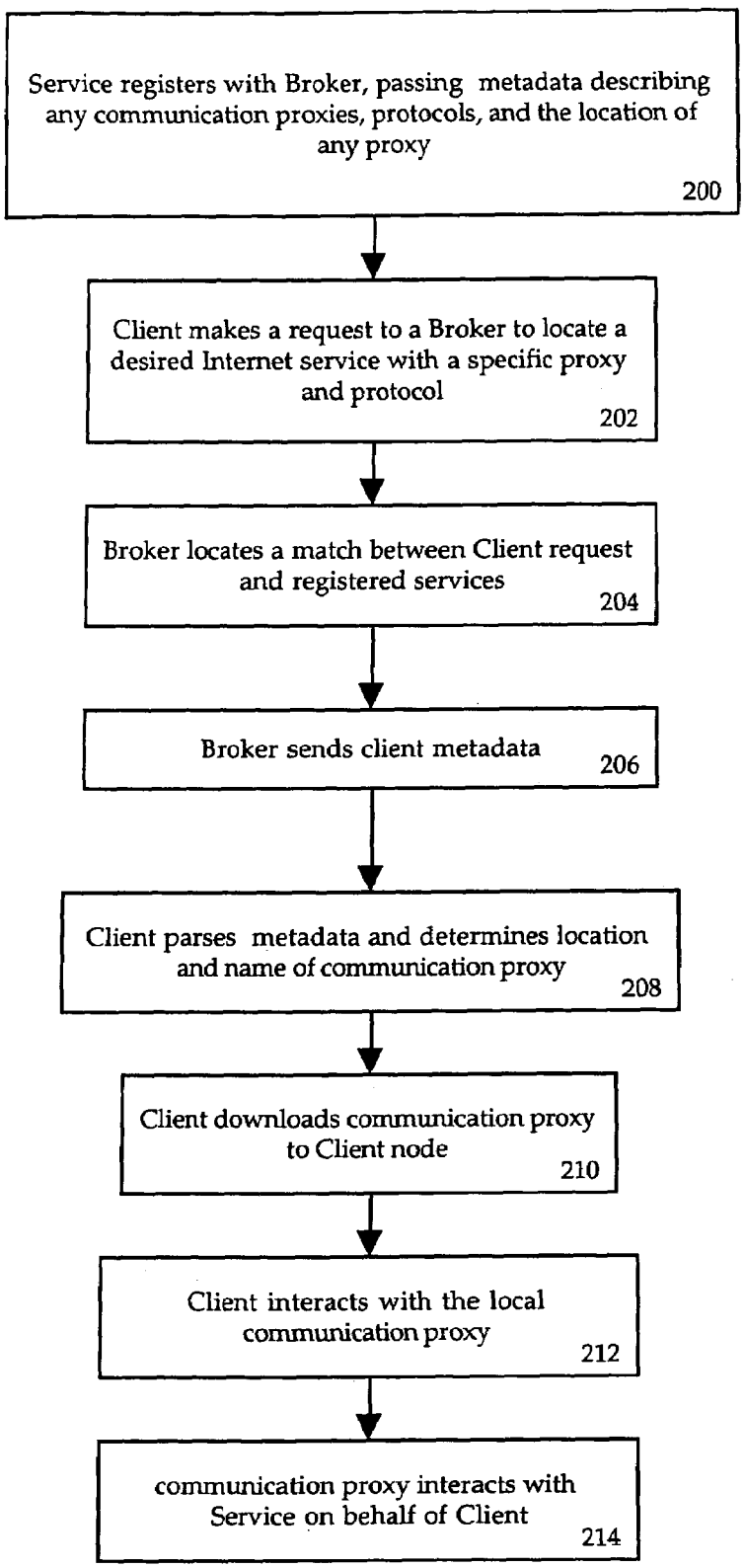
FIG. 2 is a flow diagram depicting the operation of an embodiment of the invention.

As shown in FIG. 2, in an embodiment of the invention, a method is provided utilizing the four components represented in FIG. 1. As shown in functional block 200, Service 104 registers with Broker 102, transmits metadata describing any communication proxies, and provides attributes or keywords that describe the service as well as information pertaining to any communications proxies. In an embodiment of the invention, the metadata data can be XML, hyper text markup language (html), text file, binary, etc. Service 104 can provide any proxy it desires, including CLR, Java, COM based communications proxies, Win32 binaries, etc. The communications proxy information includes the number of proxies, proxy location, proxy type and supported protocols. The supported protocols include SOAP, SMTP, MQSeries, HTTP, HTTPS, etc. The metadata describes information that Client 100 requires to interact with Service 104. The information is stored by Broker 102 for future dissemination to clients finding a matching service.

As shown in functional block 202, Client 100 registers with Broker 102 to request and locate a desired service that provides a client-requested type of communication proxy and protocol. As shown in functional block 204, Broker 102 locates a match between Client 100 request and Service 104 registered services. As shown in functional block 206, Broker 102 provides the stored metadata to Client 100. In an embodiment, Broker 102 provides a digital certificate to Client 100 ensuring the security of downloading the metadata. As shown in functional block 208, Client 100 parses the metadata and determines the location and name of the communication proxy As shown in functional block 210, Client 100 downloads, to its node, communications proxy 106 based on the location provided with the metadata returned from the Broker 102. In an embodiment, Client 100 uses a protocol to download communications proxy 106. The chosen type of communications proxy must be compatible with the environment of Client 100 so that Client 100 can interact with proxy 106. In an embodiment, after Client 100 downloads a communications proxy, Client 100 uses dynamic method discovery and invocation mechanisms. For example, in an embodiment, reflection is used with C sharp (an object-oriented programming language), and Client 100 discovers at runtime (as opposed to build-time) the methods and parameters within communication proxy 106. In an embodiment, Service 104 provides proxies supporting more than one protocol. In an embodiment, Client 100 downloads one communication proxy from Service 104 and can use multiple protocols supported by a single communication proxy.

As shown in functional block 212, Client 100 interacts directly with local communication proxy 106 to communicate with Service 104. By "local" it is meant that Client 100 and proxy 106 share the same node. The interaction between Client 100 and Service 104 is simplified since Client 100 interacts only with a local component, the communications proxy.

Client 100 downloads a communication proxy and interacts with Service 104 (by interacting with proxy 106) at runtime. If the type of protocol is not significant to Client 100, or if Client 100 fails to choose a protocol, then a default protocol of the specified communications proxy is used. In an embodiment, Client 100 is required to specify a proxy type. In an embodiment, Client 100 is required to specify a proxy type and a protocol.

As shown in functional block 214, communications proxy 106 directly interacts with Service 104 on behalf of Client 100. The remote communications burden is left to communications proxy 106. Since Service 104 provides communications proxy 106, communication proxy 106 includes the necessary logic to connect and communicate with Service 104. Client 100 is relieved of concerns including firewalls of Service 104, since proxy 106 includes the necessary information and handles such concerns. In an embodiment, proxy 106 has accessibility to the intranet and extranet of Service 104 for any needs of Client 100.

In an embodiment, Service 104 provides as many communication proxies as it desires. In an embodiment Service 104 provides no communications proxies. If no communications proxies are provided by Service 104, or if none of the provided communication proxies fulfill the needs of Client 100, then, in an embodiment, Client 100 uses a service description language provided as part of the metadata and optionally uses SOAP to interact with Service 104. In an embodiment, Client 100 receives service description language information from Broker 102 and develops an application, its own communications code, to communicate with Service 104.

The methods of a client, the methods of a broker and the methods of a service individually represent an embodiment of the invention as described below.

Figure 3:
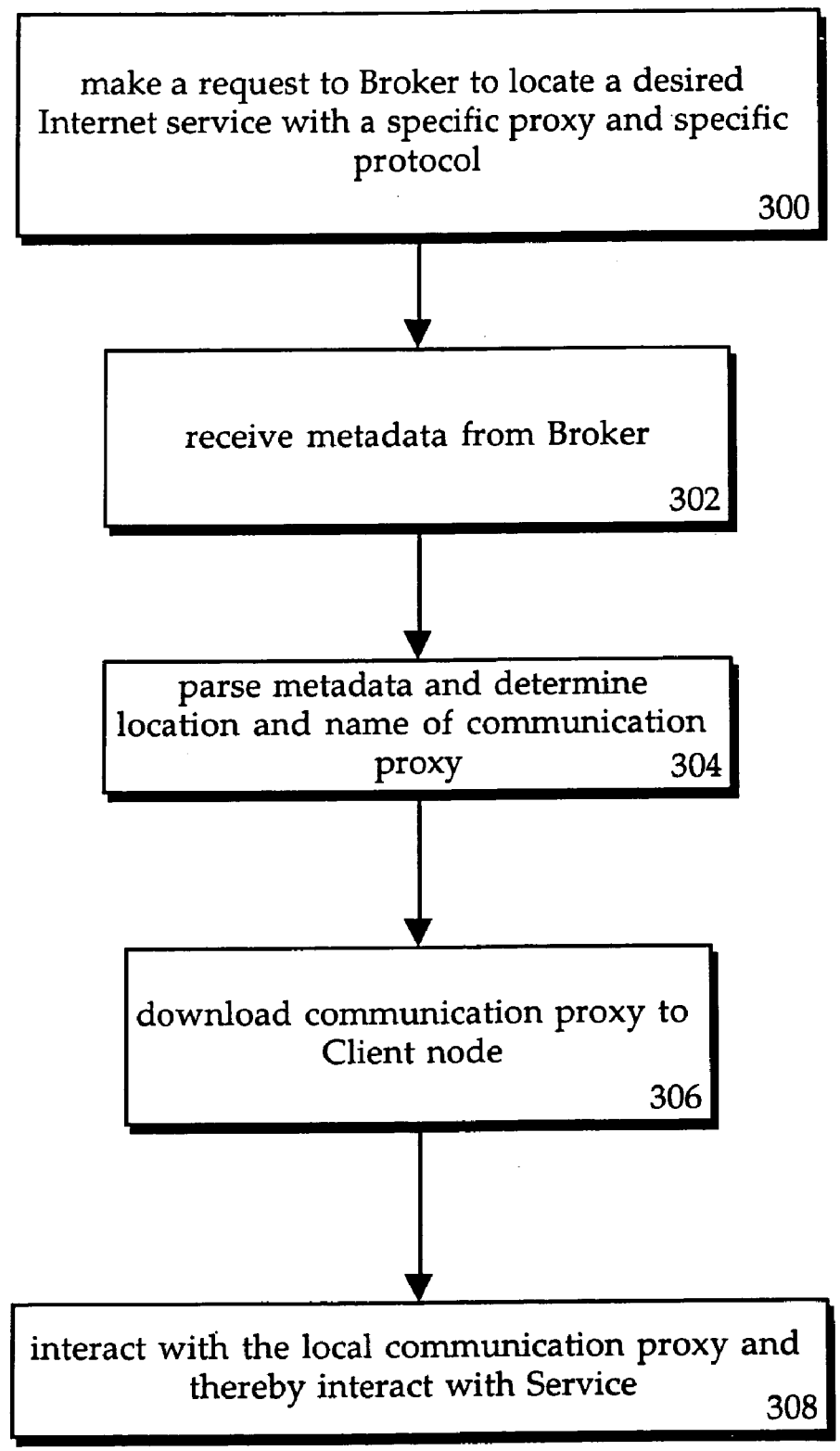
FIG. 3 is a flow diagram depicting Client functions, in an embodiment of the invention.

FIG. 3 represents an embodiment of the invention. As shown in functional block 300, Client 100 makes a request to Broker 102 to locate a desired Internet service with a specific proxy and, optionally, a specific protocol. As shown in functional block 302, Client 100 receives metadata from Broker 302. In an embodiment of the invention, the metadata data can be XML, html, text file, binary, etc. As shown in functional block 304, Client 100 parses metadata and determines the location and the name of communication proxy 106. As shown in functional block 306, Client 100 downloads communication proxy 106 to Clients node. As shown in functional block 308, Client 100 dynamically interacts, at runtime, with local communication proxy 106 and thereby interacts with Service 104.

Figure 4:
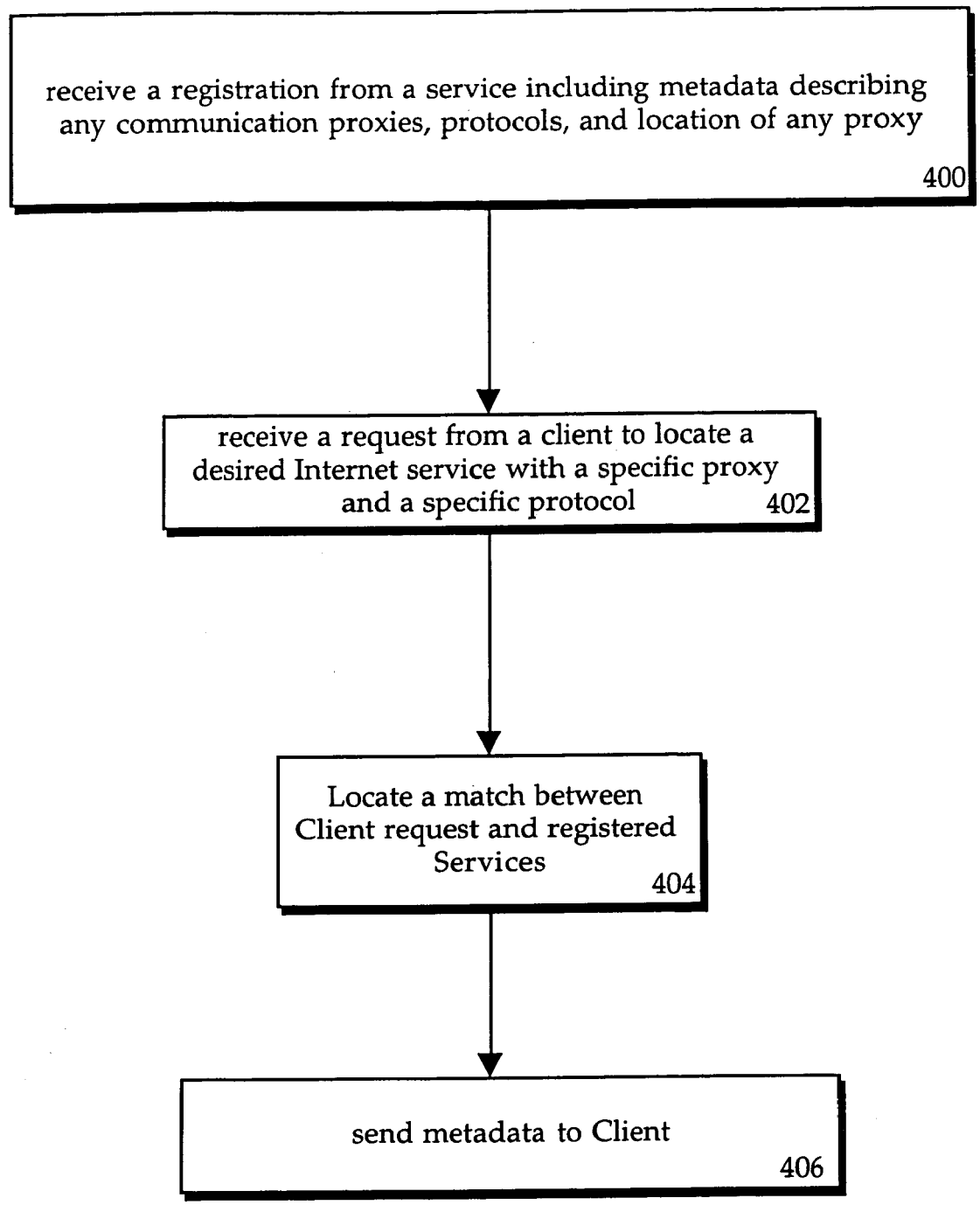
FIG. 4 is a flow diagram depicting Broker functions, in an embodiment of the invention.

FIG. 4 represents an embodiment of the invention. As shown in functional block 400, Broker 102 receives a registration from Service 104 including metadata describing communication proxies supporting various protocols, and identifying the location of each proxy. In an embodiment of the invention, the metadata data can be XML, html, text file, binary, etc. As shown in functional block 402, Broker 102 receives a request from Client 100 to locate a desired Internet service with a specific proxy and a specific protocol. As shown in functional block 404, Broker 102 locates a match between Client 100 request and Service 104 registration. As shown in functional block 406, Broker 102 sends metadata to Client 100.

Figure 5:
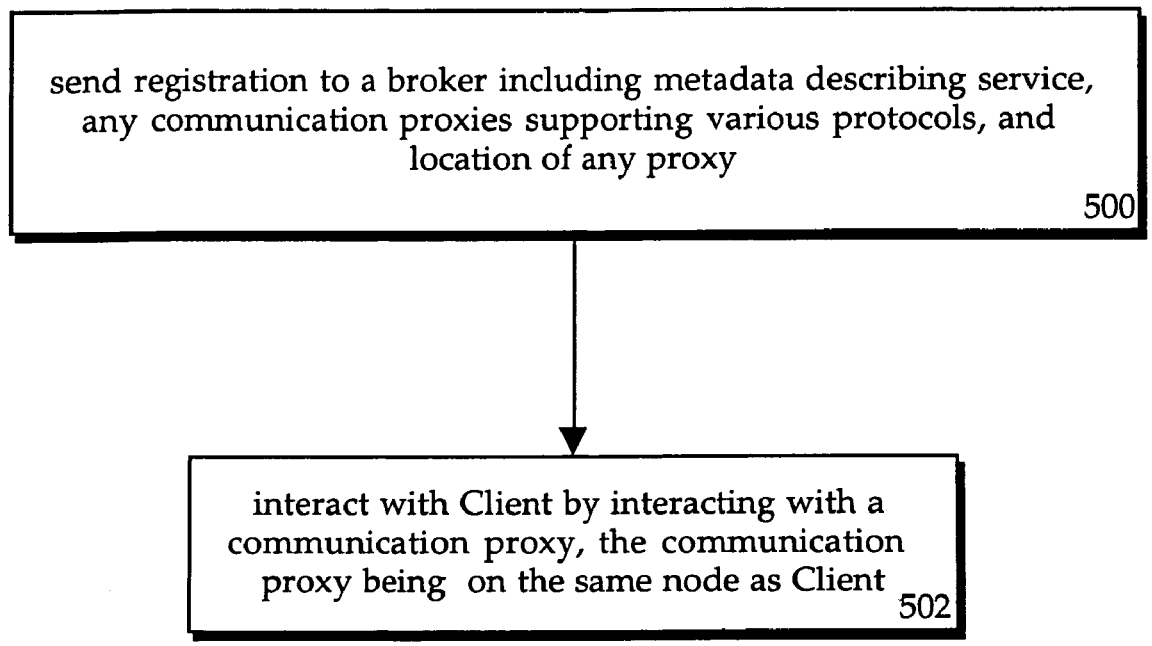
FIG. 5 is a flow diagram depicting Service functions, in an embodiment of the invention.

FIG. 5 represents an embodiment of the invention. As shown in functional block 500, Service 104 registers with Broker 102 transmitting metadata describing Service 104, any communication proxies supporting various protocols, and identifying the location of each proxy. In an embodiment of the invention, the metadata can be XML, html, text file, binary, etc. As shown in functional block 502, Service 104 interacts with Client 100 by interacting (exchanging information) with proxy 106, proxy 106 and Client 100 being on the same node.

In an embodiment of the invention, a machine readable medium is provided having instructions which when executed by a machine cause the machine to perform operations. The operations performed include requesting a desired Internet service to a broker, requesting a desired communication proxy to a broker, receiving metadata from the broker, receiving the desired communication proxy, and interacting with an Internet service using the desired communication proxy. In an embodiment of the invention, the machine downloads the desired communication proxy to a node local to a client. In an embodiment of the invention, the interacting is accomplished at runtime. In an embodiment of the invention, the interacting is dynamic interacting. The machine-readable storage medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Having disclosed exemplary embodiments, modifications and variations may be made to the disclosed embodiments while remaining within the spirit and scope of the invention as defined by the appended claims.

What is claimed is:

1. A method within a communications network, comprising:
   registering, by a service provider, an Internet service with a broker;
   transmitting, by the service provider, metadata, to the broker, describing at least one communication proxy, including at least one supported protocol, a type, and a location of the communication proxy, the communication proxy provided by the service provider to enable client-access to the registered Internet service;
   matching the registered Internet service with a client request to locate a client-desired Internet service having a client-specified communication proxy type and a client-specified application-level protocol;
   downloading the communication proxy of the registered Internet service from the location to a node local to a client that issued the client request to the broker; and
   accessing, by the communication proxy, a web server of the service provider to provide the registered Internet service to the client if a type of the communication proxy matches the client-specified communication proxy type and a supported protocol of the communication proxy matches the client-specified application-level.

2. The method as in claim 1, wherein the type of the communication proxy is one of Java, common language runtime (CLR), component object model (COM), and Win32 binaries.

3. The method as in claim 1, wherein the at least one supported protocol of the communication proxy includes at least one of hypertext transfer protocol (HTTP), simple mail transfer protocol (SMTP), simple object access protocol (SOAP), secure sockets layer (SSL/HTTPS), and secure HTTP (S-HTTP).

4. A method within a communications network comprising:
   requesting a desired Internet service, by a client, to a broker, the client request including a desired communication proxy type and a desired application-level protocol;
   receiving metadata from the broker regarding a communication proxy if the broker matches the client request within an Internet service registration, the communication proxy having at least a matching communication proxy type to the desired communication proxy type and a supported protocol of the communication proxy matches the application-level protocol specified by the client, the communication proxy provided by a service provider that registered the desired Internet service with the broker;
   downloading, by the client, the communication proxy from a location specified by the metadata; and
   interacting with a web server of the service provider using the downloaded communication proxy to receive the desired Internet service.

5. The method as in claim 4, wherein the communication proxy supports the desired application-level protocol.

6. The method as in claim 4, wherein interacting further comprises:
   remotely accessing the web server by the downloaded communication proxy according to the client.

7. The method as in claim 4, wherein interacting comprises:
   dynamic interacting.

8. The method as in claim 4, wherein receiving metadata comprises:
   obtaining one of extensible markup language (XML), hyper text markup language (html), text file, and binary.

9. The method as in claim 4, wherein the desired communication proxy type is one of Java, common language runtime (CLR), component object model (COM), and Win32 binaries.

10. The method as in claim 4, wherein the desired application-level protocol is one of hypertext transfer protocol (HTTP), simple mail transfer protocol (SMTP), simple object access protocol (SOAP), secure sockets layer (SSL/HTTPS), and secure HTTP (S-HTTP).

11. A method within a communications network comprising:
    receiving at least one Internet service registration that includes metadata regarding at least one communication proxy;
    receiving, from a client, a request to locate a client-desired Internet service having a client-specified communication proxy type and a desired application-level protocol;
    matching the request with an Internet service registration to identify a communication proxy of the communication proxy type and a supported protocol of the communication proxy matches the desired application-level protocol specified by the client, the communication proxy provided by a service provider of the desired Internet service;
    transmitting metadata to the client, the metadata including at least a location of the identified communication proxy, the identified communication proxy to enable client-access to a web server of the service provider to receive the client-desired Internet service;
    downloading the communication proxy from the location to a node local to the client; and
    accessing, by the communication proxy, a web server of the service provider to provide the Internet service to a client.

12. The method as in claim 11, wherein receiving said metadata comprises:
    obtaining descriptions of at least one supported protocol, a type, and a location of the communication proxy.

13. The method as in claim 11, wherein receiving said metadata comprises:
    obtaining one of extensible markup language (XML), hypertext markup language (html), text file, and binary.

14. The method as in claim 12, wherein the communication proxy type is at least one of Java, common language runtime (CLR), component object model (COM), and Win32 binaries; and wherein a supported protocol of the communication proxy includes at least one of hypertext transfer protocol (HTTP), simple mail transfer protocol (SMTP), simple object access protocol (SOAP), secure sockets layer (SSL/HTTPS), and secure HTTP (S-HTTP).

15. A machine readable medium having instructions which when executed by a machine cause said machine to perform a method within a communications network comprising:
    requesting a desired Internet service, by a client, to a broker, the client request including a desired communication proxy type and a desired application-level protocol;

receiving metadata from the broker regarding a communication proxy if the broker matches the client request within an Internet service registration, the communication proxy having a matching communication proxy type to the desired communication proxy type and a supported protocol of the communication proxy matches the desired application-level protocol specified by the client, the communication proxy provided by a service provider of the desired Internet service;

downloading, by the client, the communication proxy from a location specified by the metadata; and interacting, by the client, with a web server of the service provider using the downloaded communication proxy to receive the desired Internet service.

16. The machine readable medium as in claim 15, wherein interacting is accomplished at runtime.

17. The machine readable medium as in claim 15, wherein interacting comprises:

dynamic interacting.

* * * * *